Figure 1:
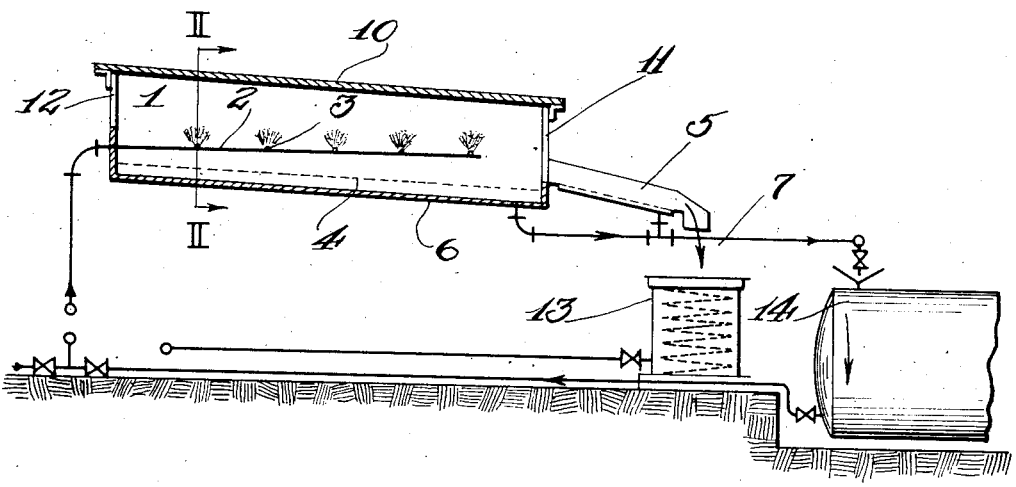

Aug. 13, 1929.    J. F. P. SCHÖNFELD    1,724,731
PROCESS FOR OBTAINING SOLID PARAFFIN

Filed Aug. 7, 1925

Johan F. P. Schönfeld INVENTOR.

BY A. B. Foster

ATTORNEY.

Patented Aug. 13, 1929.

1,724,731

UNITED STATES PATENT OFFICE.

JOHAN FREDERIK PETRUS SCHÖNFELD, OF HILVERSUM, NETHERLANDS, ASSIGNOR OF ONE-HALF TO N. V. DE BATAAFSCHE PETROLEUM MAATSCHAPPIJ, OF THE HAGUE, NETHERLANDS.

PROCESS FOR OBTAINING SOLID PARAFFIN.

Application filed August 7, 1925, Serial No. 48,888, and in the Netherlands July 4, 1925.

My invention relates to an improved process for fractionating mineral, animal, or vegetable oils and fats, or mixtures thereof, especially for obtaining solid paraffin wax from paraffin containing oil. In my copending American patent application Ser. No. 15,117 of the 12th of March, 1925, I have described and claimed a process for fractionating mixtures of mineral, animal or vegetable oils and fats especially for obtaining solid paraffin from paraffin containing oil consisting therein that the oil, the fat, or the mixture is atomized in an atmosphere of lower temperature and the atomized mass soon after leaving the atomizer is brought in intimate contact with water which is also atomized. Preferably this process is carried out in such a way that the removal of the liquid phase begins immediately after the atomizing.

My present invention relates to a process of the same kind which, however, does not necessitate the use of water. In this way it is possible to achieve the fractional crystallization where sufficient water is not available, or the water available is not sufficiently pure, for instance salt water, the latter having the drawback of corroding the metal parts of the apparatus used.

According to my present invention the raw material is very finely atomized and in that state brought into an atmosphere of air of low temperature, just as is the case in my patent application Ser. No. 15,117 of March 12th, 1925; the process according to my present invention, however, has the characterizing feature that the material is atomized and that the cooling action upon the atomized material is obtained by means of air, preferably cooled air, and preferably without the use of water.

Further my improved process according to the present invention may also be carried out in such a way that the atomized and cooled material is collected on a slightly inclined, perforated bottom in order to separate the solids thus obtained from the oil.

Forty years ago already, it has been proposed to squirt the liquid raw material upon a porous belt which is moved through a cooled room, in order to separate paraffin, stearin, or other solids from petroleum or oils. The solids were separated from the oil by leading the belt between a number of rollers, so that the oil was pressed and the solids might be removed from the rollers by means of scrapers.

This squirting process is not to be confused with the atomizing taking place according to my invention. According to my invention the separation takes place more quickly and more completely, which is easily understood taking into account the very fine division of the material.

The accompanying drawing shows in Figure 1 a diagram of an installation for carrying out the new process.

Figure 2:
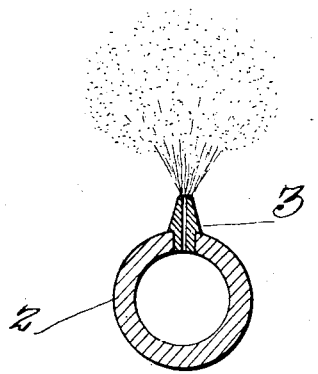

Figure 2 is a cross section of the delivery pipe on the line II—II in Figure 1.

In the working room 1 the delivery pipe 2 for the paraffin containing oil is arranged. Said pipe comprises the atomizers 3. Under the delivery pipe a perforated bottom 4 is arranged, along which the solid paraffin slowly slides to the channel 5. The oil which remains liquid passes through the perforations and flows along the bottom 6 to the piping 7.

The entire working room, especially the perforated bottom 4, is somewhat inclined and openings 11 and 12 are preferably arranged in the front and in the back wall, so that if necessary a rapid ventilation of the working room can be brought about.

The solid paraffin is fed into the container 13 where it is melted by means of a steam coil for further treatment. The liquid oil is received by the container 14, from where it may be atomized once more for depositing paraffin, which in that case, however, will have a lower melting point than that which was first separated.

The paraffin adheres together and yields a porous layer which moves slowly along the sloping bottom, the oil passing therethrough. The paraffin is led outside the working room and is then collected. The passing of the oil through the paraffin is largely promoted by longitudinal canals which are formed in the layer of paraffin during its travel along the sloping bottom.

I claim:

1. The process of separating solidifiable matter contained in mineral, animal or vegetable oils and fats or mixtures thereof which comprises atomizing such material in a liquid state in the form of very fine droplets or particles into a cooling gaseous atmosphere substantially free of water and of such a temperature, about as low as the melting or solidifying point of the product desired, that solidification of part of the liquid of the individual droplets takes place in the fine droplets while they exist as such, collecting the cooled droplets and separating liquid therefrom.

2. The process of separating solidifiable matter contained in mineral, animal or vegetable oils and fats or mixtures thereof which comprises dispersing such material in a liquid state in the form of atomized particles into a cooling gaseous atmosphere at a temperature sufficiently low to produce the partial congelation of the liquid of the atomized particles, and separating uncongealed liquid from the said partially congealed atomized liquid.

In testimony whereof I affix my signature.

JOHAN FREDERIK PETRUS SCHÖNFELD.